United States Patent
Nobili (10) Patent No.: US 10,775,813 B2
(45) Date of Patent: Sep. 15, 2020

(54) DEVICE FOR OPENING, CLOSING AND REGULATING A FLOW RATE FOR A FAUCET BODY OF A BATH OR KITCHEN

(71) Applicant: Fabrizio Nobili, San Vittore (CH)

(72) Inventor: Fabrizio Nobili, San Vittore (CH)

( * ) Notice: Subject to any disclaimer, the term of this patent is extended or adjusted under 35 U.S.C. 154(b) by 7 days.

(21) Appl. No.: 15/270,826

(22) Filed: Sep. 20, 2016

(65) Prior Publication Data
US 2017/0090491 A1    Mar. 30, 2017

(30) Foreign Application Priority Data

Sep. 25, 2015    (EP) .................................... 15186907

(51) Int. Cl.
*G05D 23/13*     (2006.01)
*F16K 11/074*    (2006.01)
*F16K 31/40*     (2006.01)
*F16K 31/08*     (2006.01)

(52) U.S. Cl.
CPC ........ *G05D 23/1313* (2013.01); *F16K 11/074* (2013.01); *F16K 31/086* (2013.01); *F16K 31/404* (2013.01)

(58) Field of Classification Search
CPC . G05D 23/1313; F16K 11/074; F16K 31/086; F16K 31/404
See application file for complete search history.

(56) References Cited

U.S. PATENT DOCUMENTS

| 5,857,489 A | * | 1/1999 | Chang ................. F16K 11/0787 137/625.17 |
| 2002/0011523 A1 | * | 1/2002 | Procter .............. G05D 23/1346 236/93 B |

(Continued)

FOREIGN PATENT DOCUMENTS

| DE | 2909939 A1 | * | 9/1980 |
| DE | 4341620 | | 6/1995 |

(Continued)

OTHER PUBLICATIONS

Mandred et al., Self-Closing Tap Valve with Magnetic Actuator of Auxiliary Valve, Jun. 16, 1995, FR2713735A1, Whole Document.*

(Continued)

*Primary Examiner* — Larry L Furdge
(74) *Attorney, Agent, or Firm* — Dorsey & Whitney LLP (57) ABSTRACT

A device for regulating a water flow rate for a faucet body, comprising: a water inlet and outlet, a closing plug having a metal part sliding inside a cylindrical chamber having a diameter substantially equal to a diameter of the plug; a pushbutton comprising a magnet associated with the metal part, the pushbutton able to be operated so as to displace the magnet and the closing plug along an axis of the cylindrical chamber, into two different stable directions, corresponding to opening or closing of the water flow. The device comprises a first disk with a hole; a second disk, coaxial with the first disk and comprising at least another hole; the second disk axially rotatable relative to the first disk, and the flow rate of the water corresponds to a cross-section of a water passage through the second holes, the cross-section associated with an angular displacement of the disks.

9 Claims, 9 Drawing Sheets (56) References Cited

U.S. PATENT DOCUMENTS

2012/0068097 A1* 3/2012 Thybo ................ F16K 11/074
                                                                251/212
2013/0334324 A1* 12/2013 Ruga .................. F16K 11/074
                                                                236/12.13
2015/0115183 A1     4/2015 Nobili

FOREIGN PATENT DOCUMENTS

| EP | 0831260 | 3/1998 |
| FR | 2713735 | 6/1995 |
| FR | 2713735 A1 * | 6/1995 |
| FR | 2713736 | 6/1995 |

OTHER PUBLICATIONS

Raetz et al., Single Lever Water Mixer . . . , Sep. 25, 1980, DE2909939A1, Whole Document.*
European Search Report for EP15186907 dated Mar. 17, 2016.

* cited by examiner

SECTION A-A 70
closed

Fig. 5a
SECTION A-A opened

DEVICE FOR OPENING, CLOSING AND REGULATING A FLOW RATE FOR A FAUCET BODY OF A BATH OR KITCHEN

FIELD OF APPLICATION

Embodiments of the present invention relate to a device for opening, closing and regulating the water flow rate for a faucet body of a bathroom or kitchen. In particular, embodiments of the invention relate to a device of the aforementioned type in which opening, closing and regulating of the water flow rate are performed manually, i.e., without using electric means.

Embodiments of the invention also relate to a method for opening, closing and regulating the water flow rate for a faucet body of a bathroom or kitchen, in particular to a method which allows high-pressure manual adjustments to be performed.

BACKGROUND

Devices designed to be installed in a faucet body of a bathroom or kitchen, in order to perform opening and closing of the water and regulation of its flow rate, are known.

In this connection there is an increasingly pressing need to reduce to the dimensions of the opening, closing and regulating devices, so as to allow installation thereof in a concealed manner also in a bathroom or kitchen faucet body having a particularly sophisticated design, in which the space for housing the devices is generally very limited, for example in a faucet body having one or more outlets associated with a shower sprinkler head, a body jet, a hand shower or a waterfall outlet.

At the same time there is a need to ensure very precise regulation of the flow rate. In some cases, it is desirable also to make provision for various modes of supplying the fluid, for example sprinkler type, by means of a rose situated in the center of the shower, jet type, by means of hydromassage nozzles situated at mid-height on the shower panel or at the bottom, or by means of a mobile hand shower, connected to a flexible pipe, etc.

Some known devices are particularly effective for performing precise regulation of the flow rate since they are electrically controlled. These devices are also viewed favorably because the control system for opening, closing or regulation is digital and therefore associated with a small-size pushbutton which is particularly sensitive to the pressure applied by the user.

However, the electronic devices are somewhat bulky because they require electric components, such as one or more motors for operating a flow rate closing valve/regulator, a sensor system, a power supply interface, an electronic board, etc.

SUMMARY

The technical problem of one or more embodiments of the present invention is that of devising a water opening and closing device which is completely manual and able to perform regulation of the flow rate and if necessary regulation of the supply mode by means of a shower sprinkler head and/or a body jet and/or a hand shower and/or a waterfall outlet associated with it at high pressure and at the same time is able to limit the overall dimensions of a bathroom or kitchen faucet body in which it is to be installed, substantially overcoming all the drawbacks which affect the currently known devices.

The idea underlying one or more embodiments of the present invention is that of providing a device for controlling the opening, closing and regulation of the water flow rate for a faucet body of a bathroom or kitchen, in which an opening/closing system comprises a closing plug, movable between two stable opening or closing positions and associated with a magnet which can be operated by means of a manual pushbutton, and is situated upstream of a system for regulating at least the flow rate.

In particular, the system for regulating the flow rate comprises two coaxial disks rotatable relative to each other, each having at least one hole, in which the flow rate is determined by the cross-section of a fluid passage formed through the two holes in the disks.

Advantageously, closing of the flow is performed by the system upstream of the disks and, when the closing plug is in the closed position, it is not needed to close the fluid passage between the holes of the disks in order to close off the water. In this way closing-off of the flow occurs immediately.

Vice versa, when the closing plug is in the open position, it is still possible to prevent supplying of water by keeping closed the fluid passage between the holes in the disks. In this way, subsequent opening, by means of gradual angular displacement of the disks, is particularly precise.

However, it is quite possible for the form and the position of the holes in the disks to prevent complete closure of the water flow and for the disks to be rotatable relative to each other solely in order to increase or reduce the flow from a maximum flow rate to a minimum flow rate and not in order to keep the water flow closed.

Preferably, the closing system is coaxial with the disks; even more preferably, the closing plug is movable along the same axis as the disks.

According to another aspect of the present invention, the downstream disk comprises several holes and each hole is in fluid communication with a duct for a respective flow supply mode. In other words, the angular displacement of one disk relative to the other one determines one of the possible supply modes.

For example, according to one embodiment, two holes in the downstream disk may be associated with two different supply modes, i.e., sprinkler or jet type; the fluid passage is formed by positioning the hole of the upstream disk opposite either hole of the downstream disk, and the flow rate is regulated by varying the cross-section of the passage by means of angular displacement of the disks.

Alternatively, according to another embodiment, three holes in the downstream disk may be associated with three different supply modes, i.e., sprinkler, jet or hand shower. The fluid passage is formed by positioning the hole of the upstream disk opposite one of the three holes of the downstream disk, and the flow rate is regulated by varying the cross-section of the passage, by means of angular displacement of the disks.

According to another aspect of the present invention, fluid passages associated with different supply modes may be supplied simultaneously. A fluid passage through several holes in the downstream disk is defined by an angular displacement which positions the hole of the upstream disk over said several holes.

According to the proposed solution mentioned above, the technical problem is solved by a device for opening, closing and regulating the water flow rate in a faucet body for a bathroom or kitchen, comprising:

a water inlet and outlet, a closing plug having at least one metal part sliding inside a cylindrical chamber with a diameter substantially equal to the diameter of the closing plug;

a pushbutton comprising a magnet associated with the metal part of the closing plug;

the pushbutton being able to be operated so as to displace the magnet and the closing plug along an axis of the cylindrical chamber, into two different stable positions, corresponding to opening or closing of the water flow by the device, characterized in that it comprises:

a flow regulation unit comprising:

a first disk comprising at least one hole in fluid communication with the outlet;

a second disk comprising a second hole, said second disk being coaxial with the first disk and in contact with the first disk;

the second disk is axially rotatable relative to the first disk and the flow rate of the water passing from the flow regulation unit corresponds to a cross-section S of a water passage defined by the disks in the region of the first hole and the second hole, the cross-section being variable with a relative angular displacement $\alpha$ of the first disk and the second disk.

In one embodiment, the first disk comprises a third hole, and the flow rate of the water corresponding to the cross-section S of the passage defined by the disks in the region of the first hole and the second hole is associated with the relative angular displacement $\alpha$ of the first disk and the second disk, where $\alpha'<\alpha<\alpha''$, and a relative angular displacement $\beta$ of the first disk and the second disk, where $\beta'<\beta<\beta''$ and $\alpha''<\beta'$, is associated with a cross-section S' of a second passage formed by the disks in the region of the first hole and the third hole, the first passage being associated with one fluid supply mode and the second passage being associated with another supply mode.

In another embodiment the first disk comprises at least one fourth hole, and a relative angular displacement $\emptyset$ of the first disk and the second disk, where $\emptyset'<\emptyset<\emptyset''$ and $\beta''>\emptyset'$, is associated with a cross-section S'' of at least one third passage formed by the disks in the region of the first hole and the at least one fourth hole, where the third passage is associated with a supply mode different from the other supply modes.

According to one aspect of the present invention, for a given angular displacement $\alpha$, the first passage and the second passage are open and associated with a respective cross-section S, S' for simultaneous supplying at a corresponding flow rate P1, P2 in the first and second supply modes.

For a given angular displacement $\beta$, the second passage and the third passage are open and associated with a respective cross-section S', S'' for simultaneous supplying at a corresponding flow rate P1, P2 in the second and third supply modes.

According to another aspect of the invention, for an angular displacement $\emptyset$, the first passage, the second passage and the third passage are all open and associated with a respective cross-section S, S', S'' for simultaneous supplying at a corresponding flow rate P1, P2, P3 in the first, second and third supply modes.

According to a further embodiment, for a given angular displacement $\alpha$, the third passage and the second passage are closed and the first passage is associated with a respective cross-section S for exclusive supplying at a flow rate P1, in the first supply mode.

Similarly, for a given angular displacement $\beta$, the first passage and the second passage may be closed and the third passage is associated with a respective cross-section S'' for exclusive supplying at a flow rate in the third supply mode.

Preferably, the first disk and the second disk have the same radius and the first hole is at a radial distance from the center of the first disk substantially corresponding to a radial distance of the second hole, the third hole or the fourth hole from the center of the disk.

According to one aspect of the invention, the first hole, the third hole and the fourth hole in the first disk are circular and the second hole is a window situated in a circle segment of the second disk.

According to the proposed solution mentioned above, the technical problem is solved by a method for regulating the water flow rate in a faucet body for a bathroom or kitchen, comprising the steps of:

activating opening or closing of the flow by means of a pushbutton comprising a magnet associated with the metal part of a closing plug, the metal part being slidable inside a cylindrical chamber with a diameter substantially equal to the diameter of the closing plug, and the pushbutton being able to be operated so as to displace the magnet and the closing plug along an axis of the cylindrical chamber, into two different stable positions, corresponding to opening or closing of the water flow by the device, characterized in that regulation of the flow rate is performed by rotating a knob or the pushbutton axially and rotating via said pushbutton or the knob a second disk comprising a second hole, said second disk being coaxial with a first disk and in contact with the first disk;

the second disk, rotating axially with respect to the first disk, regulates the flow rate of the water passing through a water passage defined by the disks in the region of the first hole and the second hole, said cross-section being variable with a relative angular displacement $\alpha$ of the first disk and the second disk.

Further characteristic features and advantages of embodiments the present invention will become clear from an embodiment described purely by way of a non-limiting example, with reference to the accompanying drawings.

DETAILED DESCRIPTION

With reference to the attached figures, a number of examples of embodiment of a device 1 for opening, closing and regulating the water flow rate, intended to be applied to a faucet body for a bathroom or kitchen are described.

The examples of embodiment are provided without limitation of the scope of protection of the present invention and with the sole aim of highlighting the advantages of the device 1, for example in the case where it is installed in the faucet body of a shower, without however excluding the possibility of its use in other areas, for example as a faucet body of a washbasin or a kitchen sink or a hydromassage tub.

Preferably, the device 1 is assembled as a cylindrical body or unit 50 (FIG. 1b) or a cartridge which can be inserted inside the body of a faucet, in particular inside a seat of the faucet with a diameter and depth of a few centimeters, for example a diameter of 4-7 cm and depth of 10-15 cm.

The device 1 has an inlet 2 for the water, for example formed by a lateral opening 52 in a cylindrical and hollow unit 51, preferably by three lateral openings 52 at the same angular distance on the unit 51. The hollow cylindrical unit 51 forms a terminal portion of the cylindrical unit 50. The inlet 2 may be connected to an outlet of a thermostatic mixer, the thermostatic mixer having hot water and cold inlets associated with inlets of a faucet body and an outlet for mixed water.

A water outlet 3 is associated with a central opening 54 of the unit 51, inside which a system 60 for regulating at least the flow rate (FIG. 6a) is mounted. In particular, the system 60 for regulating the flow rate comprises at least two coaxial disks 10, 12 rotatable relative to each other and each having at least one hole.

Figure 6A:
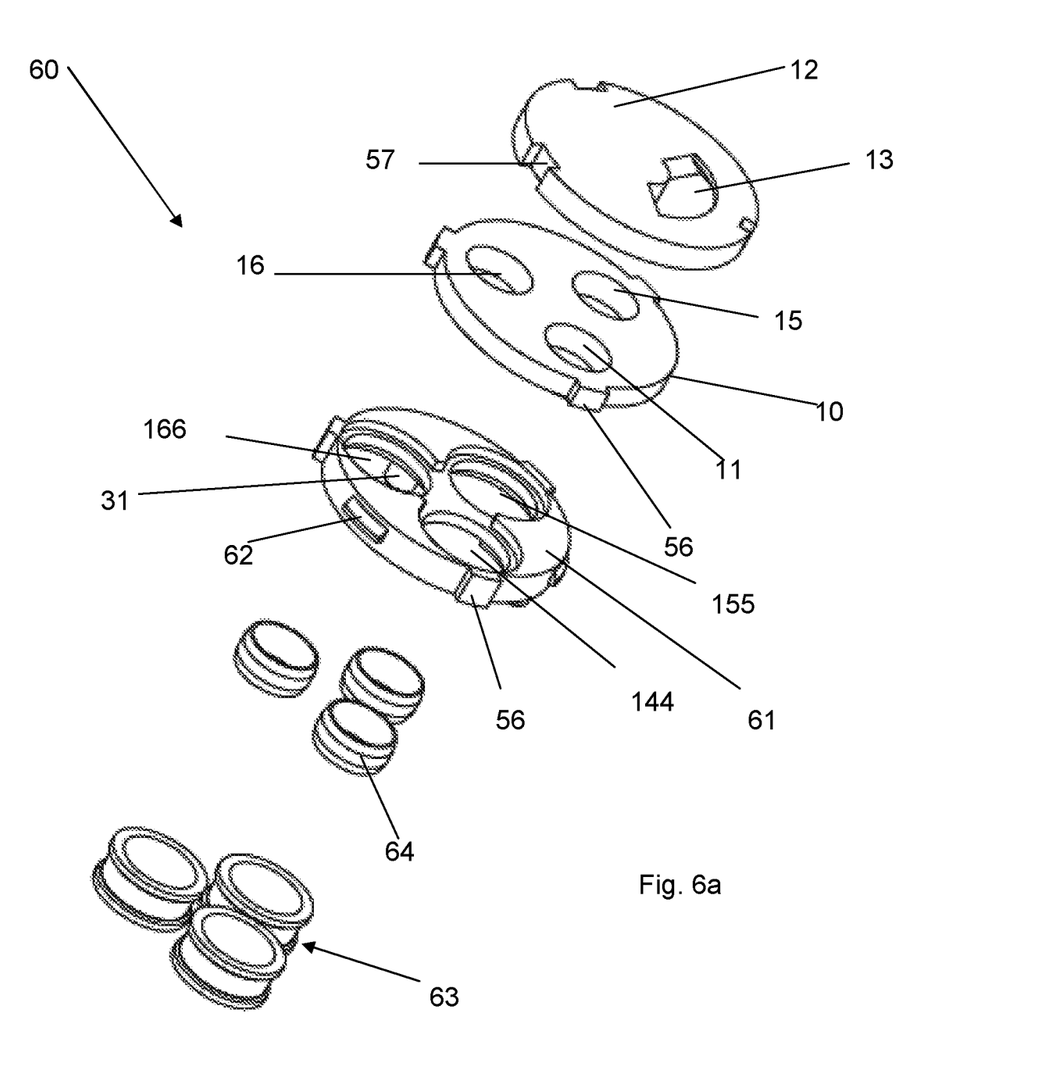
FIGS. 6a-6d are perspective exploded views of the device according to FIG. 1, illustrating the method of assembly of the device, and in particular show the fixing components (FIG. 6d), the selection, opening and closing components (FIG. 6c), the opening and closing components (FIG. 6b) and the water diversion components (FIG. 6a).

In the example of embodiment provided with reference to FIG. 6a, a first disk 10 has three holes 11, 15, 16 and a second disk 12 has one hole 13.

Figure 6B:
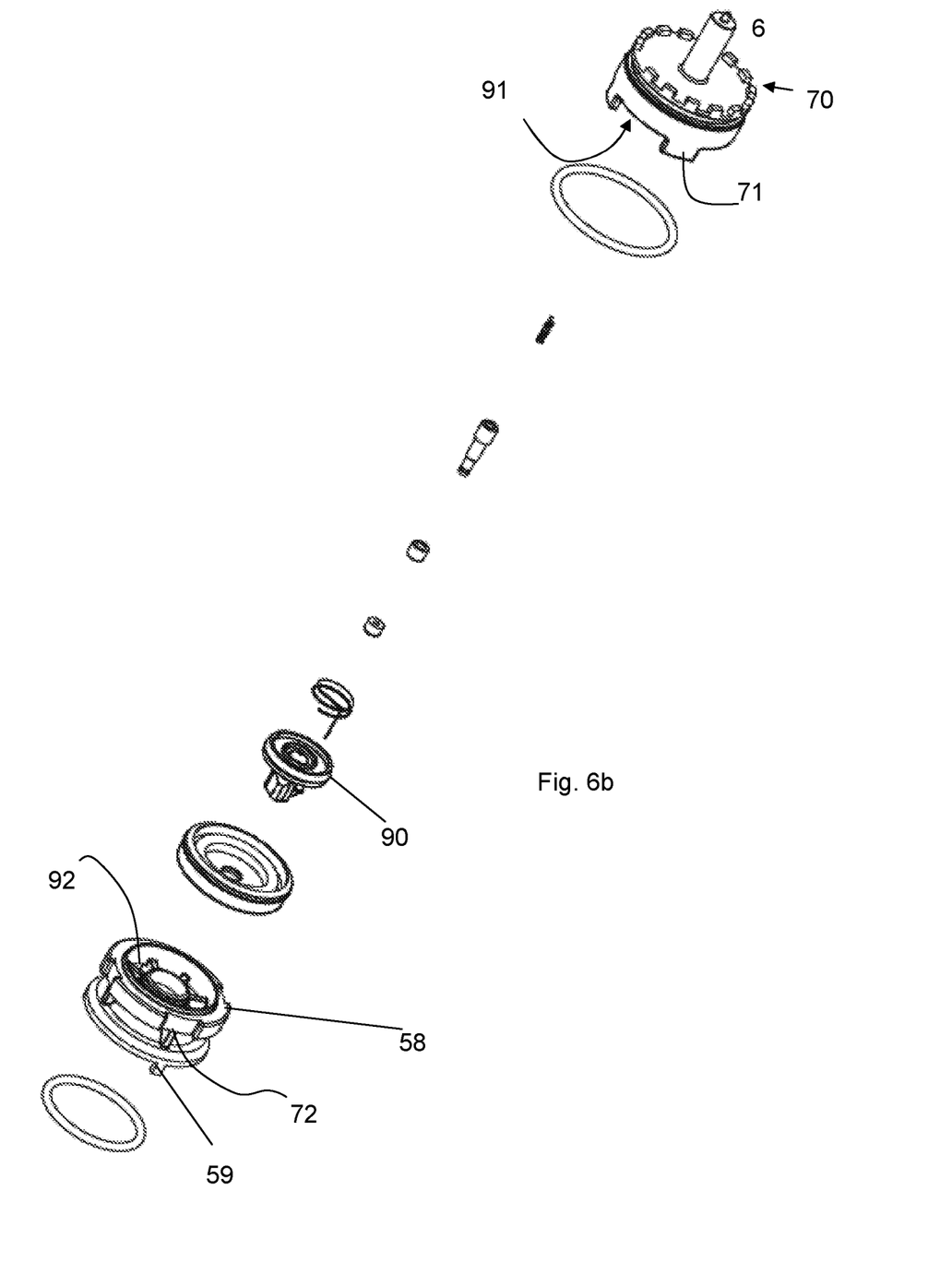

The first disk 10 is locked together with the unit 51. For example three equidistant windows 55 on the side surface of the cylindrical unit 51 form snap-engaging seats for a corresponding number of projections 56 on the first disk 10 and, when the parts are engaged, prevent a rotation of the disk 10 with respect to the unit 51. The second disk 12 does not have the projections 56 and comprises a number of recesses 57, for example three equidistant recesses 57, and is free to rotate axially inside the cylindrical unit 51, by means of coupling of the recesses 57 together with a regulating unit 58 shown in FIG. 6b. The regulating unit 58 is provided with projections 59 coupled with the recesses 57 of the second disk 12, causing the second disk 12 to be locked together with the regulation unit 58 and axially rotatable inside the cylindrical unit 51.

In the example of embodiment shown in the figures, the regulating unit 58 is associated with a unit 70 for opening and closing the flow, for example by means of engagement of projections 71 on the opening and closing unit 70 with respective recesses 72 in the regulating unit, which rotationally lock together the units 58 and 70.

The first and second disks are made of ceramic material.

A third disk 61, which is made of plastic and has three holes 144, 155, 166 and three projections 56 like the first disk 10, is mounted on the cylindrical unit 51 and fixed to its end, preferably by means of a snap-engaging system consisting of a further projection 61 on the third disk 61, preferably three projections 62, and respective snap-engaging seats 65 on the unit 51. The third disk does not rotate relative to the unit 51 and its holes are aligned with the holes in the first disk 10. The holes 144, 155, 166 are fitted with three circular seals 63 inside which three rings 64 of metallic or plastic material are mounted.

A pin 31, or preferably two equidistant pins 31, projecting from the base of the third disk 61, protrudes from the unit 51 and is intended to fix the unit 51 to the body of the faucet. The pin 31 is formed integrally with the third disk 61. Once the unit 51 is fixed to the faucet body, only the second disk 12 is axially rotatable relative to the unit 51, while the disks 10, 61 are locked together with it.

In particular, the second disk 12 is axially rotatable relative to the first disk 10 and the flow rate is determined by the cross-section of a fluid passage formed through a hole in the first disk 10 and the hole in the second disk 12.

Even more particularly, the second disk 12 is axially rotatable relative to the first disk 10, and the flow rate of the water passing from the flow regulation unit 51 corresponds to a cross-section S of a water passage 14 (FIG. 1c) defined by the disks in the region of the first hole 11 of the first disk 10 and the one hole 13 of the disk 12. The cross-section S is variable with a relative angular displacement α of the first disk 10 and the second disk 12.

Figure 2A:
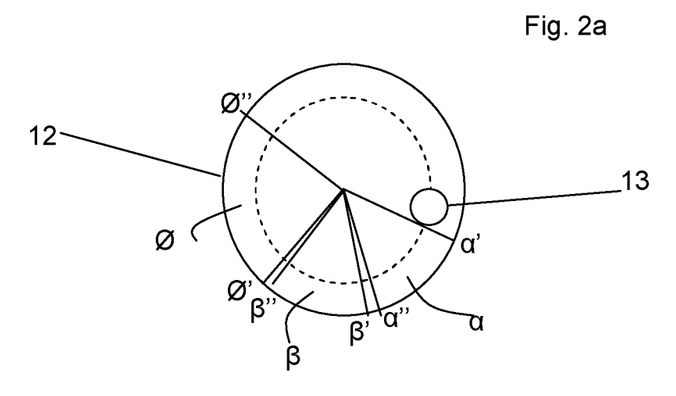
FIG. 2*a* is a view of the second regulating disk of the device according to FIG. 1.
Figure 2B:
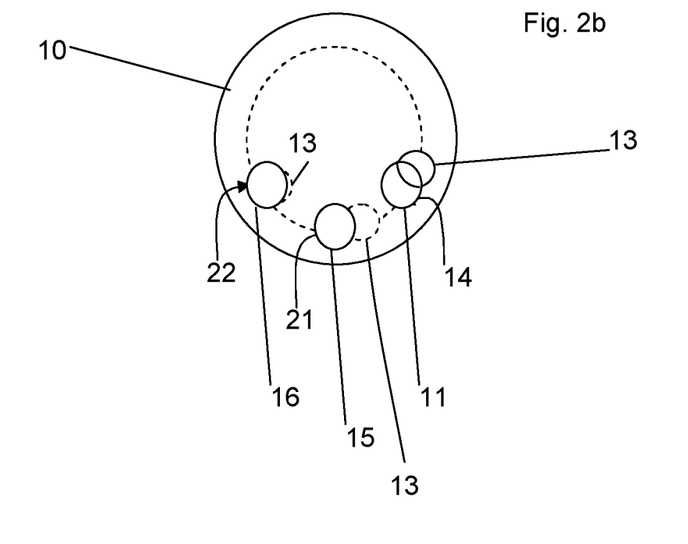
FIG. 2*b* is a view of the first regulating disk of the device according to FIG. 1, arranged over the second regulating disk according to FIG. 2*a*, in accordance with different relative angular displacements of the two disks (holes shown in broken lines).

FIG. 2a shows in schematic form the second disk 12 with the hole 13 in a position α'. FIG. 2b shows in schematic form the second disk 12 superimposed on the first disk 10. In the position α' the second disk 12 closes the hole 11 of the first disk 10. In a position α>α' the hole 13 of the second disk 12 is at least partly positioned opposite the hole 11 of the first disk 10 and forms a water passage 14 having a flow rate which increases with an increase in the open cross-section of the hole 11. In an advanced position α", the second disk 12 closes again the hole 11 of the first disk 10.

In other words, for a predefined angular displacement α, the second disk allows regulation of the flow rate through the hole 11 of the first disk 10, which may be associated, by means of the faucet body, with a first supply mode.

Similarly, for other predefined angular displacements, the second disk allows regulation of the flow rate through the hole 15 or the hole 16 in the first disk 10, which holes may be associated, by means of the faucet body, with a second and a third supply mode.

However, even if the example of embodiment provided with reference to FIG. 6a relates to a device able to regulate the output via three different holes 11, 15, 16 available on the first disk 10, and therefore potentially for supplying water by means of three modes associated with the three holes 11, 15, 16, the other embodiments are not limited to this embodiment, but embrace, for example, also a device 1 with a single outlet hole 11 on the first disk 10, and therefore a device able to regulate only the flow rate through said hole 11.

In this case, the device regulates the water flow rate passing from the flow regulation unit 51 and corresponding to the cross-section S of a single possible passage 14 defined by the disks 10, 12 in the region of a single first hole 11 available on the first disk 10 and a single hole 13 available on the second disk 12.

Similarly, the invention embraces also embodiments in which the second disk has, for example, one hole and the first disk has two holes. In this case, the device may be associated with a faucet body which controls supplying in two different modes.

In particular, the first disk 10 comprises a second hole 15, and the water flow rate corresponding to the cross-section S of the passage 14 defined by the disks 10, 12 in the region of the first hole 11 of the first disk 10 and the hole 13 of the second disk 12 is associated with the relative angular displacement $\alpha$ of the first disk 10 and the second disk 12, where $\alpha'<\alpha<\alpha''$, while a relative angular displacement $\beta$ of the first disk 10 and the second disk 12, where ($\beta'<\beta<\beta''$ and $\alpha''<\beta'$, is associated with a cross-section S' of a second passage 21 formed by the disks in the region of the first hole 10 and the second hole 15, the first passage 14 being associated with one fluid supply mode and the second passage 21 being associated with another supply mode.

In the example of embodiment provided specifically with reference to FIGS. 6a and 2b, the device also comprises a third hole 16 on the first disk 10, and a relative angular displacement $\emptyset$ of the first disk 10 and the second disk 12, where $\emptyset'<\emptyset<\emptyset''$ and $\beta''>\emptyset'$, is associated with a cross-section S' of a passage 22 formed by the disks in the region of the first hole 10 and the third hole 16, and the third passage 22 is associated with a supply mode different from the other supply modes.

According to different embodiments of the present invention, which all fall within the scope of protection of the application, when the first disk 10 has more than one outlet hole 12, it is possible to envisage that engagement of the second disk 12 with the first disk 10 allows simultaneous supplying via two or more holes in the first disk 10 or exclusive supplying via only one of said holes.

For example, according to an embodiment where the first disk 10 has three holes 11, 15 and 16, for a given angular displacement $\alpha$, the first passage 14 and the second passage 21 are open and associated with a respective cross-section S, S' for simultaneous supplying at a corresponding flow rate P1, P2, associated with a first mode and second mode for supplying via the faucet body. Said flow rates P1, P2 are variable with the angular displacement of the second disk 12 relative to the first disk 10. Again according to this embodiment, for an angular displacement $\beta$, the second passage 21 and the third passage 22 are open and associated with a respective cross-section S', S" for simultaneous supplying at a corresponding flow rate P1, P2 in the second and third supply modes through the associated faucet body. These flow rates P1, P2 also vary with the angular displacement of the second disk 12 relative to the first disk 10.

According to another embodiment, for an angular displacement $\emptyset$, the first passage 14, the second passage 21 and the third passage 22 are all open and associated with a respective cross-section S, S', S" for simultaneous supplying at a corresponding flow rate P1, P2, P3 in the first, second and third supply modes, via a faucet body associated with the device 1.

In the case where it is required to perform exclusive supplying via one of the many holes provided in the first disk 10, it is instead envisaged that, for a given angular displacement $\alpha$, the third passage 22 and the second passage 21 are closed (namely the angular position of the first disk with respect to the second disk is such that neither the third passage nor the second passage are formed) and that the first passage 14 is associated with a respective cross-section S for exclusive supplying at a flow rate P1 in the first supply mode.

Similarly, according to this embodiment, for another angular displacement $\beta$, the first passage 14 and the second passage 21 are closed (namely the angular position of the first disk with respect to the second disk is such that neither the first passage nor the second passage are formed) and the third passage 22 is associated with a respective cross-section S" for exclusive supplying at a flow rate P1 in the third supply mode.

Closing and opening of the flow in the device 1 is performed by means of the unit 70. This unit comprises a closing plug 4 having at least one metal part 5 sliding inside a cylindrical chamber 6 having a diameter substantially equal to the diameter of the closing plug 4. An associated magnet 8 is associated with the metal part 5 of the closing plug 4 and is slidable above the cylindrical chamber 6.

A pushbutton 7 can be operated manually so as to displace the magnet 8 and the closing plug 4 along an axis X of the cylindrical chamber 6, into two different stable positions, corresponding to opening or closing of the water flow by the device.

Figure 6C:
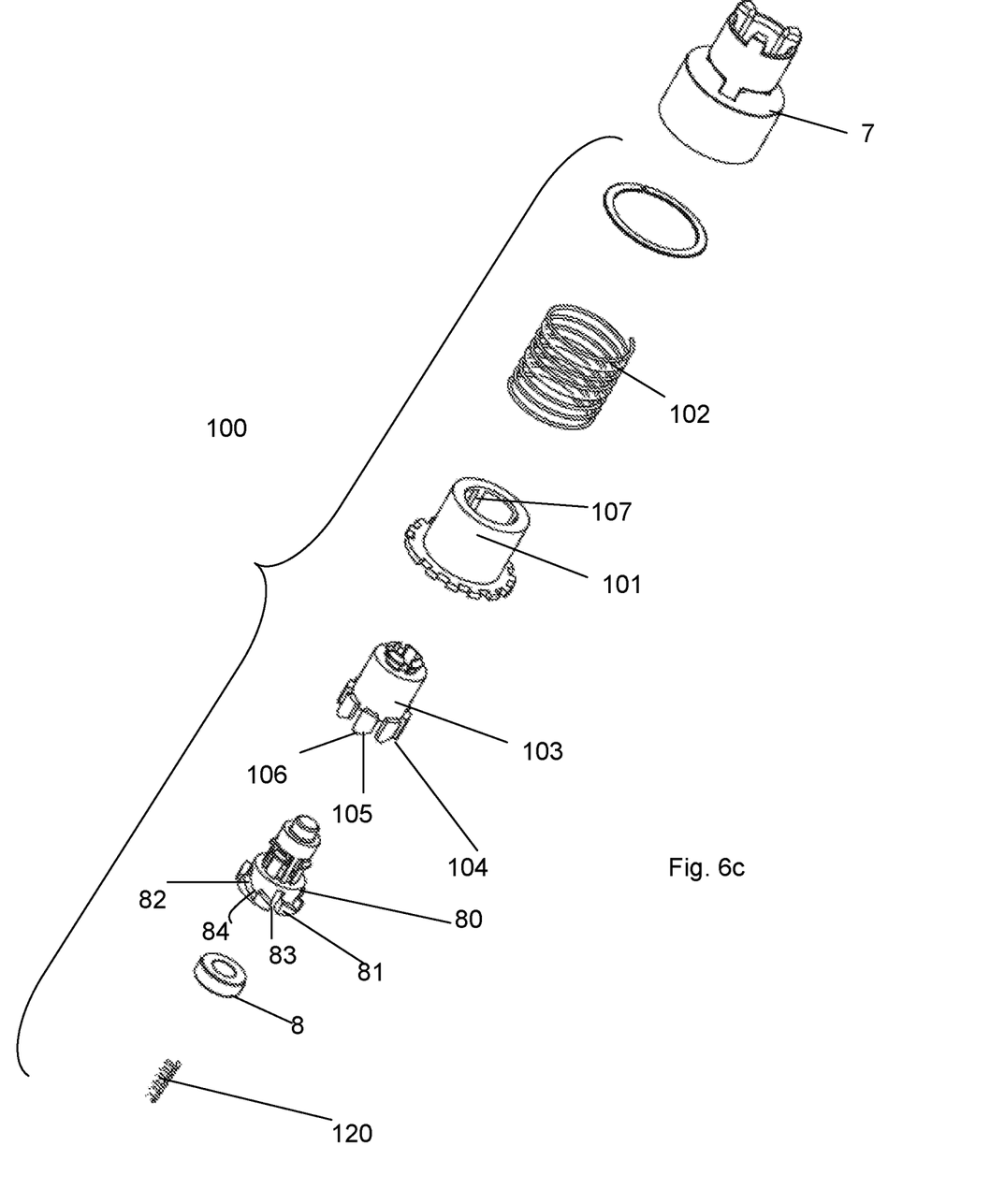
Figure 6D:
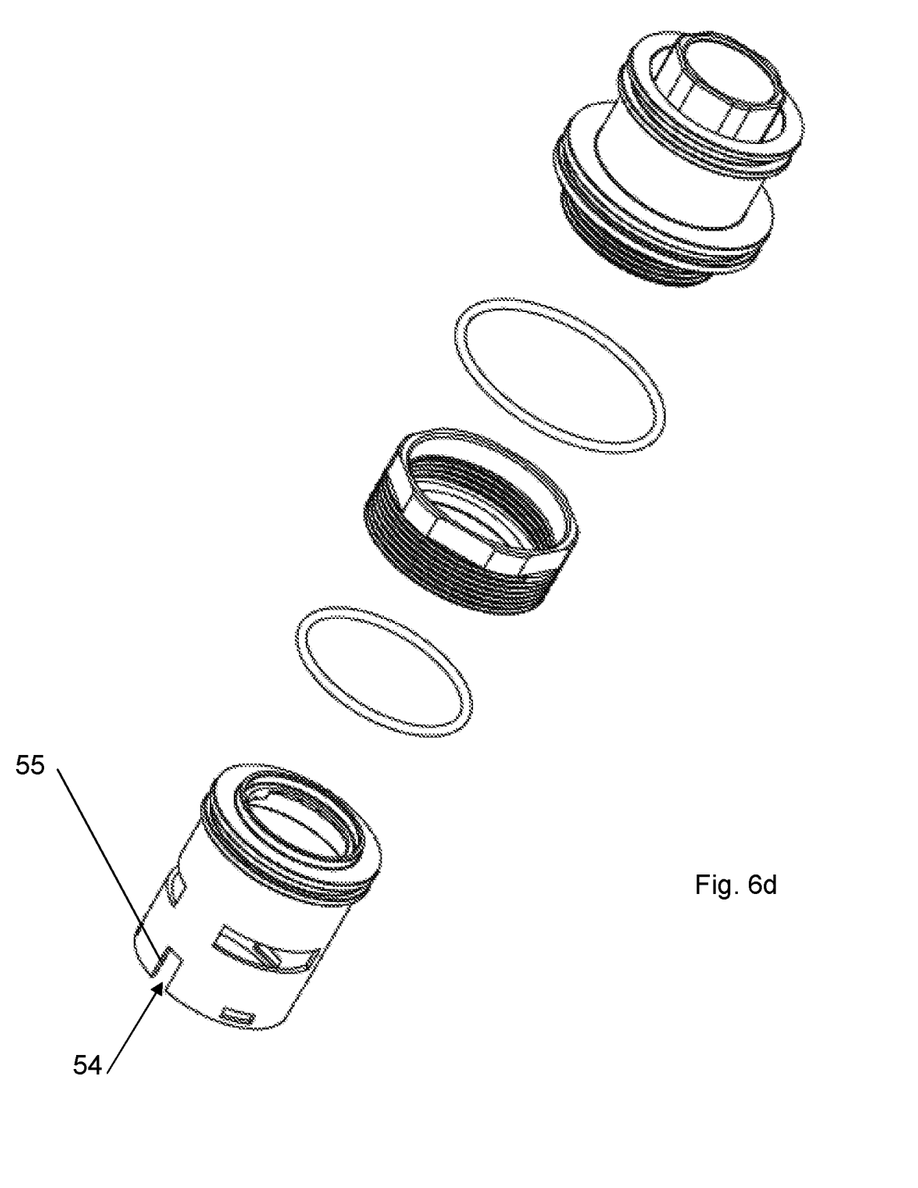

In particular, the pushbutton 7 is associated with the magnet 8 and the unit for opening and closing the flow 70 by means of the system 100 (FIG. 6c) which allows operation of the pushbutton 7 axially, so as to switch the magnet and the closing plug between two stable positions or rotate the pushbutton 7 in order to vary the angular position of the second disk 12 with respect to the first disk 10.

The closing plug 4 acts on a disk 90 for closing or opening the flow. The pressure exerted manually on the pushbutton 7 only serves to move the magnet 8 and the associated closing plug 4 a few millimeters; this displacement serves only to bring the closing plug 4 into contact with the disk 90 or move the closing plug 4 away from the disk 90. Closing of the disk 90, and in particular closing of a small hole in the center of the disk 90, causes a rapid displacement of the disk 90 so as to close the flow, as a result of filling of a chamber 91 in which the disk is movable. The chamber 91 is filled with water under pressure from the water supply mains, which displaces the disk 90 into the closed position, against the outlet 92, preventing the water flow towards the first disk 10 and the second disk 12 for regulating the flow rate.

Vice versa, the separation of the closing plug 4 from the disk 90 produces a rapid movement of the disk 90 away from its closed position, owing to emptying of the chamber 91 and the pressure of the water entering into the device.

In other words, during closing, the water inside the chamber 91 exerts a pressure on the disk 90, compressing it against a fluid outlet, while, during opening, the absence or reduction of the water inside the chamber 91, and therefore the absence or reduction of the pressure exerted on the disk 90 towards the outlet, allows the water outlet 92 towards the disks 10, 12 to be freed.

FIGS. 6a-6d show, in an exploded and perspective view, the components of the device according to an embodiment of the present invention.

Figure 3A:
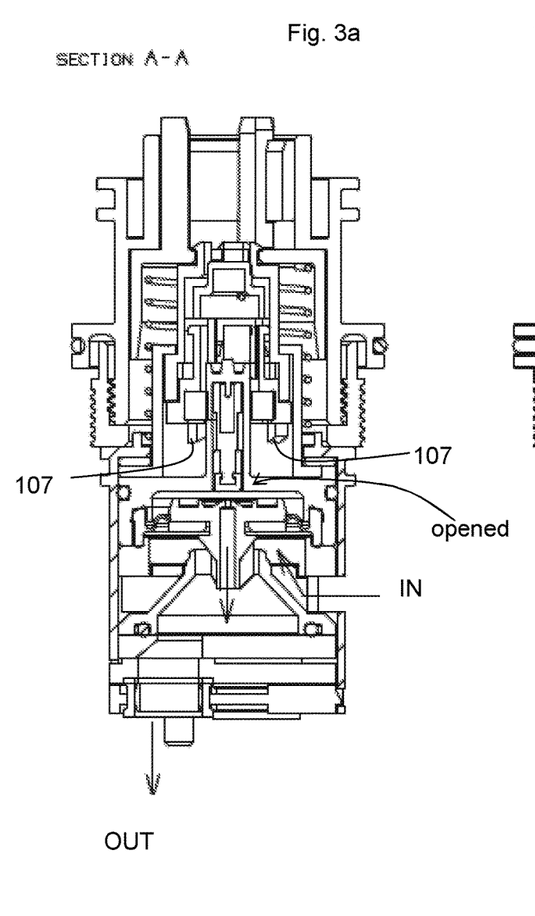
FIG. 3*a* is a cross-section A-A through the device according to FIG. 3*b*.
Figure 3B:
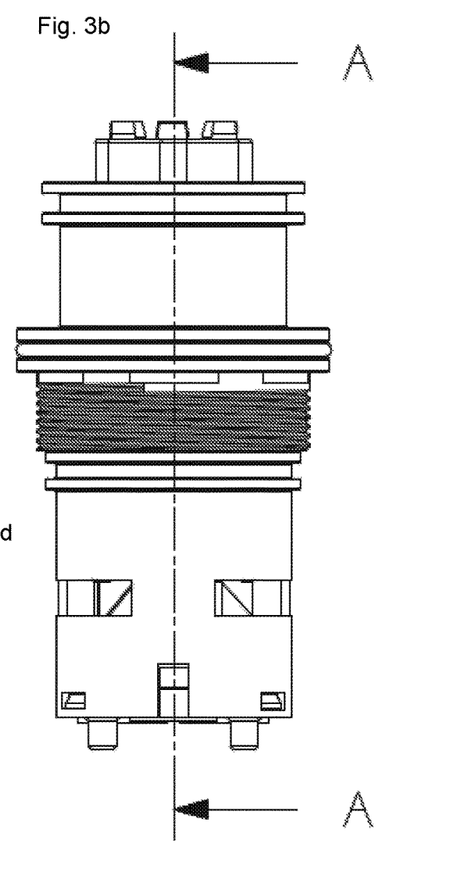
FIG. 3*b* is a view of the device according to FIG. 1*b*, in which the device is open and set to supply water through the first water passage, formed through the first hole in the first disk and the second hole in the second regulating disk.
Figure 3C:
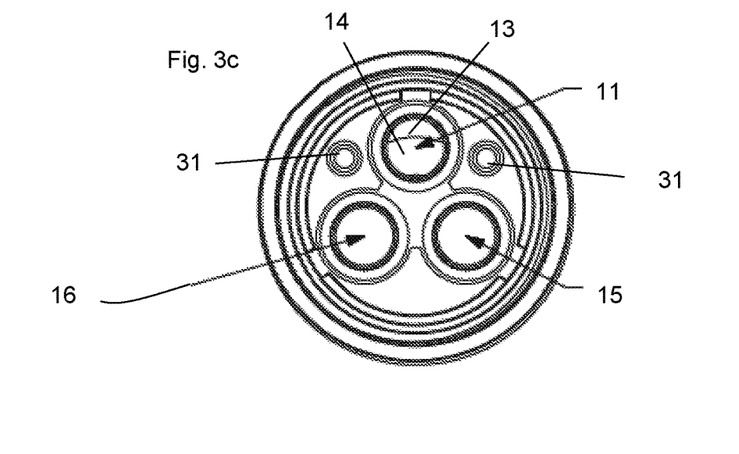
FIG. 3c is a view from below of the device according to FIG. 3b.

The magnet 8 is inserted inside a body 80 (Figure c) externally provided with a plurality of teeth 81 having inclined surfaces 82; the teeth 81 are associated with respective projections 104 on the outer side of a body 103, each provided with two oppositely inclined surfaces 105, 106. The two teeth 81 have, formed between them, a space 83 inside which a guide 107 (visible also in FIG. 3a) situated on the inner surface of a body 101 is slidably engaged over a predetermined length of the body 101. The body 80 is inserted inside the body 103 and, together with it, inside the body 101.

The top part of the body 103 is engaged with the pushbutton 7, such that the pushbutton 7 and the body 103 are locked together. The pushbutton 7 has a hollow cylindrical section which fits over the body 101, and a spring is arranged between the body 101 and the pushbutton 7. The body 101 is also cylindrical and hollow and the body 103 is slidable inside the body 101. The body 80 has a section with a larger diameter slidable inside the body 101 and a section with smaller diameter inserted insider the body 103. The spaces 83 between the teeth are on the smaller-diameter section. The larger-diameter section receives the cylindrical chamber 6.

A spring 120 is arranged between the body 80 and the cylindrical chamber 6.

Figure 1A:
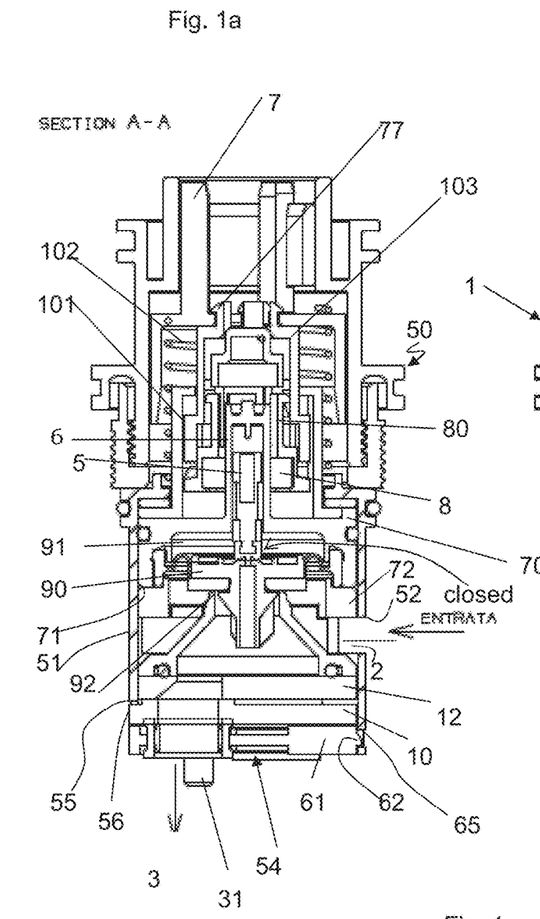
FIG. 1*a* is a cross-section A-A through a device shown in FIG. 1*b* for opening, closing and regulating the water flow rate, according to an embodiment of the present invention.
Figure 1B:
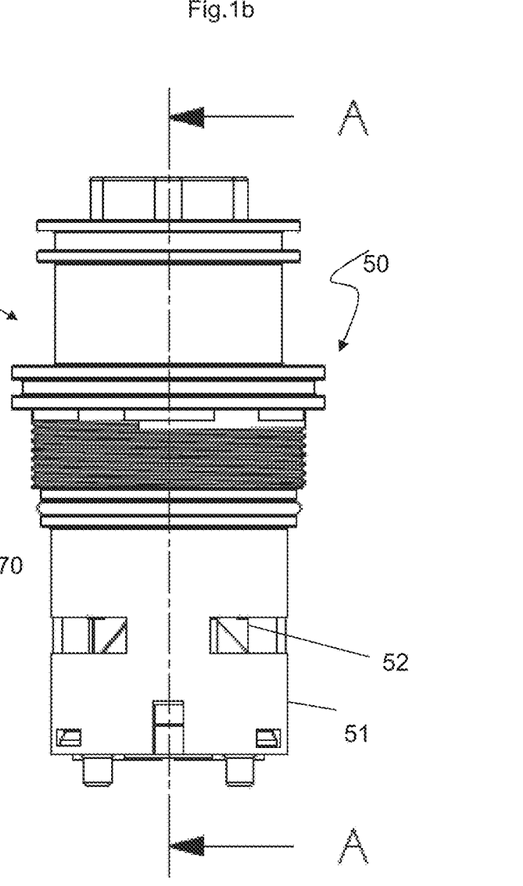
FIG. 1*b* is a side view of the device, in which the device is closed and set to supply water through a first water passage formed through a first hole in a first regulating disk and a second hole in a second regulating disk.
Figure 1C:
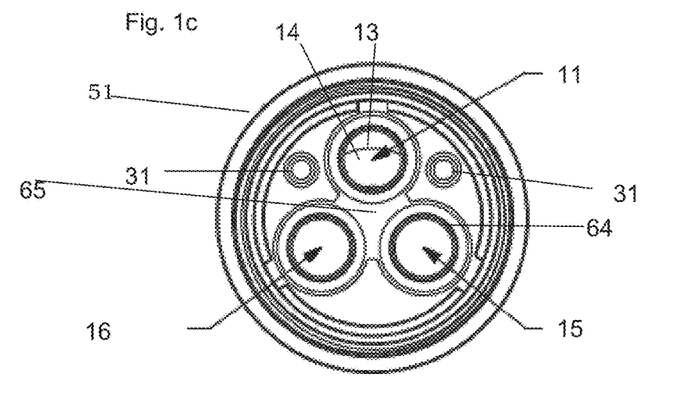
FIG. 1*c* is a view from below of the device according to FIG. 1*b*.
Figure 4A:
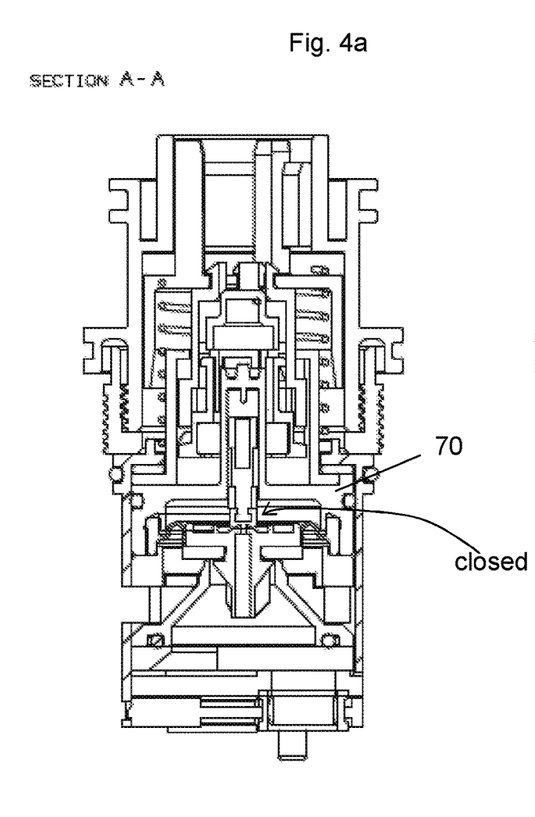
FIG. 4a is a cross-section A-A through the device according to FIG. 4b.
Figure 4B:
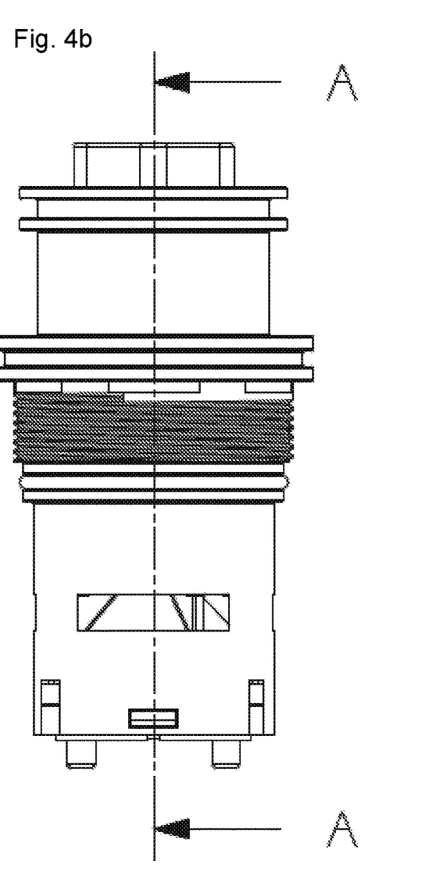
FIG. 4b is a view of the device according to FIG. 1b, in which the device is closed and set to supply water through a second water passage, formed through a third hole in the first disk and the second hole in the second regulating disk.
Figure 4C:
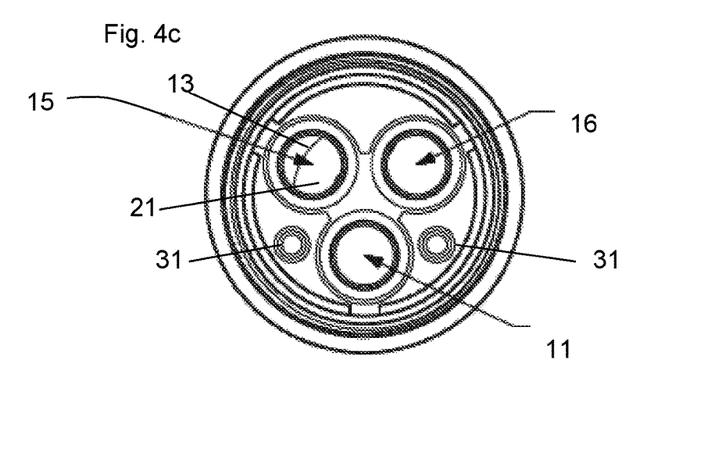
FIG. 4c is a view from below of the device according to FIG. 4b.
Figure 5A:
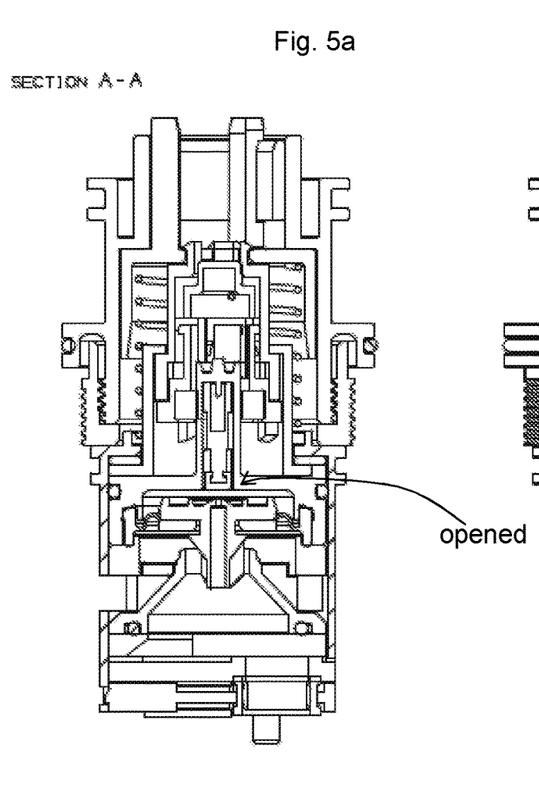
FIG. 5a is a cross-section A-A through the device according to FIG. 5b.
Figure 5B:
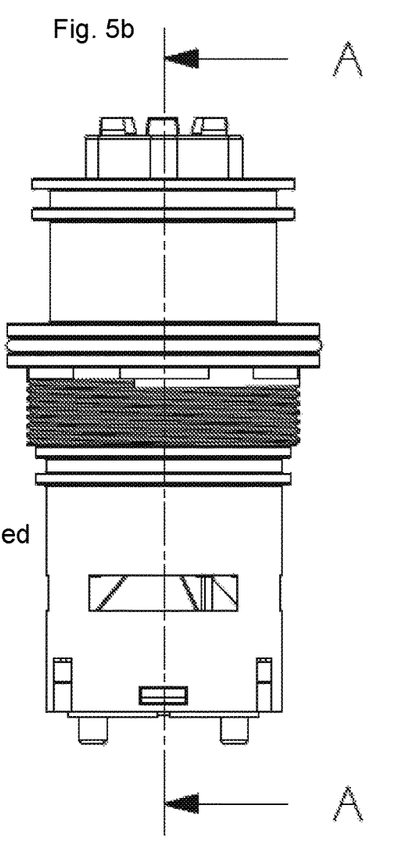
FIG. 5b is a view of the device according to FIG. 1b, in which the device is open and set to supply water through the second water passage, formed through the third hole in the first disk and the second hole in the second regulating disk.
Figure 5C:
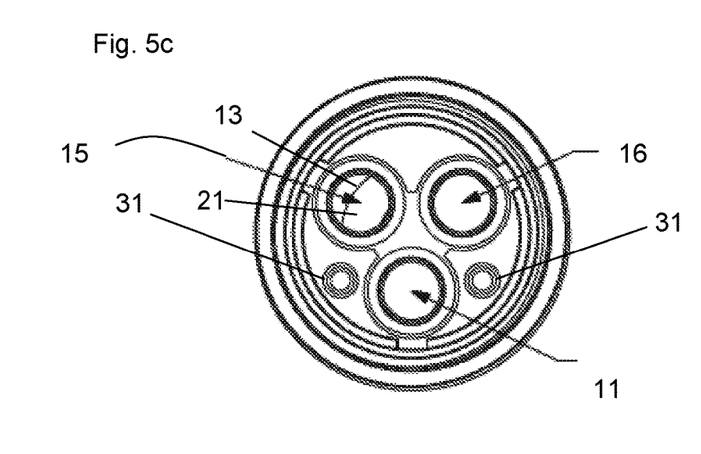
FIG. 5c is a view from below of the device according to FIG. 5b.

In this connection, as can be seen from FIG. 1a, the body 80 has a first cylindrical section which houses the magnet 8 and a second closed cylindrical section with a diameter smaller than that of the first section, which receives the spring and the end part of the cylindrical chamber 6. The body 103 is fitted onto the body 80. Operationally speaking, the pushbutton 7 may slide axially (e.g. from the position shown in FIG. 3a) together with the body 103 so as to move the body 80 downwards, owing to the contact between the inclined surface 106 and the inclined surface 82. The body 80 does not rotate along a predetermined axial section where the guides 107 are engaged inside the spaces 83 between the teeth 81; along a further axial section, the body 80 comes out of the guides 107 and performs a rotation caused by sliding of the surface 106 on the inclined surface 82, this terminating when the surface 105 makes contact with a tip 84 of the tooth 81, reaching a first equilibrium position in which closing of the flow is performed (FIG. 4a).

When the pushbutton 7 is released, the spring moves the pushbutton and the body 103 away from the body 80 which however maintains its equilibrium position because the guides 107 are in contact with the teeth 81, along the vertical surface before the tip 84, therefore preventing the body 80 from moving back upwards. In other words, for the predefined rotation which the body 80 performs with respect to the body 101, the guides are no longer inserted between the spaces 83, but make contact above the teeth.

In order to reach the second stable position, corresponding to opening of the flow, the pushbutton 7 is operated again. In particular, with a pressure applied onto the pushbutton 7, the body 103 is lowered and the inclined surface 106 again comes into contact with the inclined surface 82, causing, firstly, lowering of the body 80 until the tip 84 is uncovered by the guides 107 and, subsequently, a further rotation of the body 80 which repositions the spaces 83 opposite the guides 107, allowing the body 80 to move back up between the guides 107.

Advantageously, according to an embodiment of the present invention, closing of the flow is performed by means of the disc 90 which is operatively associated with the closing plug 4, and closing plug 4 serves only to trigger the movement of the disk 90 inside the chamber 92.

Advantageously, closing of the flow is performed by the unit 70 upstream of the disks and, when the closing plug is in the closed position, it is not needed to close the fluid passage between the holes of the disks in order to close off the water. In this way closing-off of the flow occurs immediately.

Vice versa, when the closing plug is in the open position, it is still possible to prevent supplying of water by keeping closed the fluid passage between the holes in the disks. In this way, subsequent opening, by means of gradual angular displacement of the disks, is particularly precise.

The invention claimed is:

1. A device for opening, closing and regulating the water flow rate, intended to be mounted in a faucet body of a bathroom or kitchen, comprising:
   a water inlet, the water inlet being adapted to provide water;
   a water outlet of the device;
   an opening and closing system including:
      a closing plug having at least one metal part the at least one metal part slidable inside a cylindrical chamber with a diameter substantially equal to the diameter of the closing plug; and
      a pushbutton comprising a magnet associated with the at least one metal part of the closing plug; the pushbutton operable to displace the magnet and the closing plug along an axis of the cylindrical chamber, into two different stable positions, corresponding to opening or closing of the water flow by the device; and
   a flow regulation unit arranged to regulate flow of the water, the flow regulation unit comprising:
      a first disk including at least one first hole in fluid communication with the water outlet of the device; and
      a second disk including a first hole and a second hole, the second disk being coaxial with the first disk, in contact with the first disk, and axially rotatable relative to the first disk;
   wherein:
      a first flow rate of the water passing from the flow regulation unit corresponds to a first delivery mode and a first cross-section of a first water passage defined by the first disk and the second disk in a first region of the first hole of the first disk and the first hole of the second disk, the first cross-section being variable with a relative angular displacement $\alpha$ of the first disk and the second disk the first flow rate being associated with the relative angular displacement $\alpha$ of the first disk and the second disk, where $\alpha'<\alpha<\alpha''$;
      a second flow rate of the water passing from the flow regulation unit corresponds to a second delivery mode and a second cross-section of a second water passage formed by the first disk and the second disk in a second region of the first hole of the first disk and the second hole of the second disk, the second cross-section being variable with a relative angular displacement $\beta$ of the first disk and the second disk, where $\beta'<\beta<\beta''$ and $\alpha''<\beta'$;
      the water outlet of the device is associated with the first water passage and the second water passage to deliver water in the first delivery mode and the second delivery mode, the first flow rate corresponding to the first delivery mode being different than the second flow rate corresponding to the second delivery mode;

for a first given angular displacement of the first disk and the second disk, both the first water passage and the second water passage are open and associated with the first cross-section and the second cross-section for simultaneous delivery of the water at a corresponding flow rate in the first delivery mode and the second delivery mode;

the water outlet of the device is in an axial direction and the water inlet is in a radial direction;

the opening and closing system is arranged in a fluid path between the water inlet and the flow regulation unit such that closure of the opening and closing system prevents water flowing towards the flow regulation unit; and the flow regulation unit is arranged in the fluid path between the opening and closing system and the water outlet of the device to regulate the water flow rate through the water outlet of the device if the opening and closing system is opened.

2. The device according to claim 1, wherein:
the first disk comprises at least one third hole;
a relative angular displacement Ø of the first disk and the second disk, where Ø'<Ø<Ø" and β">Ø', is associated with a third cross-section of at least one third water passage formed by the disks in a third region of the first hole of the second disk and the at least one third hole; and
the third water passage is associated with a third flow rate and a third delivery mode different from the first and second delivery modes.

3. The device according to claim 2, wherein, for a second angular displacement of the first disk and the second disk, the second water passage and the at least one third water passage are open and associated with the second cross-section and the third cross-section, respectively, for simultaneous supplying of the water at the second flow rate in the second delivery mode and the third flow rate in the third delivery mode.

4. The device according to claim 2, wherein, for a third angular displacement of the first disk and the second disk, the first water passage, the second water passage, and the at least one third water passage are all open and associated with the first cross-section, the second cross-section, and the third cross-section, respectively, for simultaneous supplying of the water at the first flow rate in the first supply mode, the second flow rate in the second supply mode, and the third flow rate in the third supply mode.

5. The device according to claim 1, wherein, for a given angular displacement of the first disk and the second disk, the third water passage and the second water passage are closed and the first water passage is associated with a respective cross-section for exclusive delivering of the water at the first flow rate in the first supply mode.

6. The device according to claim 2, wherein, for a given angular displacement of the first disk and the second disk, the first water passage and the second water passage are closed and the third water passage is associated with a respective cross-section for exclusive delivering of the water at the third flow rate in the third supply mode.

7. The device according to claim 2, wherein the first disk and the second disk have substantially the same radius and the first hole of the second disk is at a radial distance from a center of the second disk corresponding to a radial distance of the first hole, the second hole, or the third hole of the first disk from the center of the first disk.

8. The device according to claim 2, wherein the first hole of the first disk, the second hole of the first disk, and the third hole of the first disk are circular and the first hole of the second disk is a window situated on a circular segment of the second disk.

9. A method for regulating the water flow rate for a faucet body of a bathroom or kitchen, the method comprising:
activating opening or closing of a flow by a pushbutton, the pushbutton including a magnet associated with the metal part of a closing plug, the at least one metal part being slidable inside a cylindrical chamber with a diameter substantially equal to the diameter of the closing plug, the pushbutton operable to displace the magnet and the closing plug along an axis of the cylindrical chamber, into two different stable positions, corresponding to opening or closing of the water flow by the device, wherein the pushbutton and the closing plug forms an opening and closing system of the device; and
regulating the flow of water already mixed by a thermostatic mixer by:
rotating a knob or the pushbutton axially; and
rotating, via the pushbutton or the knob, a second disk including a first hole, said second disk being coaxial with a first disk and in contact with the first disk;
wherein:
the second disk rotates, axially with respect to the first disk, to a first position with a relative angular displacement α of the first disk and the second disk to regulate the water flow rate of the water passing through a first water passage associated with a first delivery mode and defined by the first disk and the second disk in a first region of the first hole of the second disk and a first hole of the first disk,
the second disk rotates, axially with respect to the first disk, to a second position with a relative angular displacement β of the first disk and the second disk to regulate the water flow rate of the water passing through a second water passage associated with a second delivery mode and defined by the first disk and the second disk in a second region of the first hole of the first disk and a second hole of the second disk, the flow rate in the first delivery mode being different than the flow rate in the second delivery mode,
for a given angular displacement, the first passage and the second passage are open and associated with the first cross-section and the second cross-section for simultaneous delivery of the water at a corresponding water flow rate in the first delivery mode and the second delivery mode,
a water outlet of the device is in the axial direction and the water inlet is in a radial direction,
the opening and closing system is arranged in a fluid path between the water inlet and the flow regulation unit such that closure of the opening and closing system prevents water from flowing towards the flow regulation unit, and
the flow regulation unit is arranged in the fluid path between the opening and closing system and the water outlet of the device such that the water flow rate is regulated through the water outlet of the device if the opening and closing system is opened.

\* \* \* \* \*